July 10, 1956     F. RENTZ ET AL     2,753,650
ARTIFICIAL BUBBLE FOR FISHING TACKLE
Filed April 17, 1953
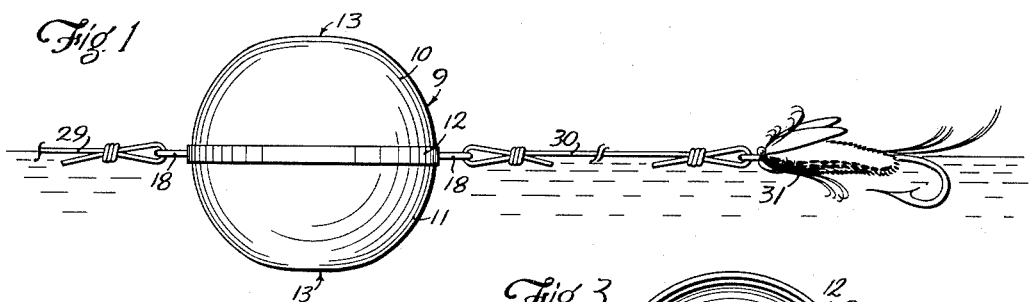
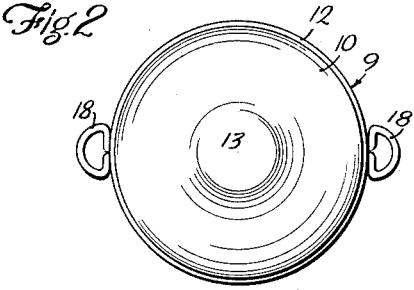
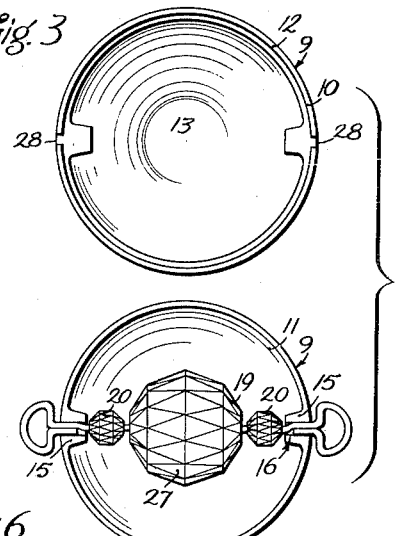
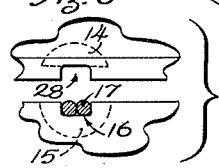
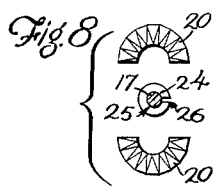
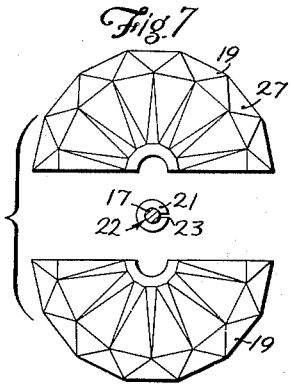
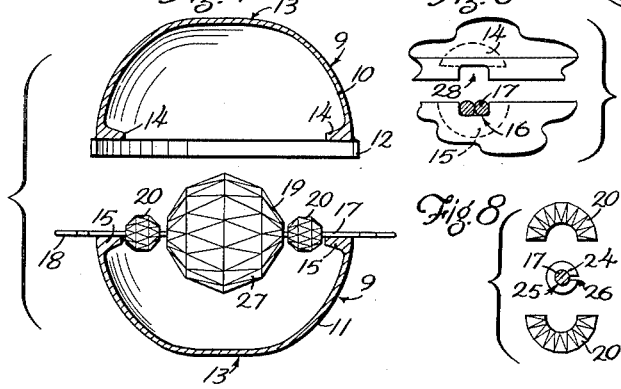
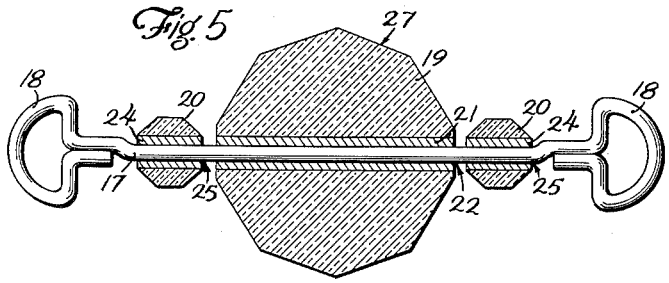
INVENTOR.
Frank Rentz and
BY Anna Rentz
By: Daniel K. Kilgore
Attorney

2,753,650
ARTIFICIAL BUBBLE FOR FISHING TACKLE

Frank Rentz and Anna Rentz, Wells, Minn.

Application April 17, 1953, Serial No. 349,432

1 Claim. (Cl. 43—42.33)

Our invention relates to improvements in fishing tackle, and more particularly to an artificial bubble having housed therein weights, said weights having light reflecting surfaces visible through the transparent bubble shell to afford better position on the water surface of the bait in any of the conventional fishing techniques, to wit: fly fishing, bait casting and still fishing. Our invention interposed in the conventional tackle assembly and especially in combination with a dry fly, will keep all of the components of such an assembly in proper alignment during the cast or laying out of the line and the weight afforded by the crystal bubble is a definite aid in permitting the use of lures of different weights. It will be further understood that the weight of the inner crystal weights is critical in that they must partially overcome the natural buoyancy of the shell so that at rest on water, the shell will have the exact appearance of a natural bubble, its upper one-half portion only being above the water line.

An object of this invention is to provide a novel artificial bubble which, when casting, will lay a line and a lure on the surface of the water.

Still another object is to provide a transparent artificial bubble containing a novel weight that reflects light.

These and other objects will be apparent from the following description, reference being had to the drawing.

To the above end, generally stated, the invention consists of the novel devices and combination of devices hereinafter described and defined in the claim.

Referring to the drawings:

Fig. 1 is a side elevational view of the invention to which is attached a fishline and an artificial fly is also attached thereto by a leader;

Fig. 2 is a top view of the invention;

Fig. 3 is a plan view of the two sections of an artificial bubble, the upper section being inverted;

Fig. 4 is a view principally in central vertical section with its two sections separated certain elements being shown in full;

Fig. 5 is a detail view, on an enlarged scale, with some parts in plan, some parts in central horizontal section and with other parts removed;

Fig. 6 is a fragmentary detail view, on an enlarged scale, in end elevation with the rod shown in section;

Fig. 7 is a detail view on an enlarged scale of the light reflector and weight in which the parts thereof are separated; and Fig. 8 is a detail view, on an enlarged scale, of one of the spacers in which the parts thereof are segregated.

The numeral 9 indicates a spherical shell of clear transparent material, such as plastic, that simulates a bubble. This shell 9 comprises an upper one-half section 10 and a lower one-half section 11. The sections 10 and 11 are duplicates except the upper section 10 has an annular flange 12 that surrounds the perimeter of the lower section 11 and caps the same.

The crown of each section 10 and 11 is flattened at 13 to prevent the shell 9 from spinning in the water. Diametrically horizontally opposite pairs of internal bosses 14 and 15, integral with the sections 10 and 11, respectively, are provided, the bosses 14 and 15 of each pair having flat contacting surfaces in the plane of the joint between the sections 10 and 11 of the shell. In the upper surface of each lower boss 15 is a wide, shallow notch 16 that extends longitudinally through said boss and the shell.

A round rod 17 extends horizontally through the shell 9 with its end portions resting in the notches 16. The end portions of the rod 17, outwardly of the shell 9, are bent at each end portion to form an eye 18 and then folded and extended into the respective notch 16. The rod 17 and its folded end portions completely fill the notches 16 and prevent the rod 17 from turning about its long axis and the overlying bosses 14 prevent the rod 17 from lifting in said notches.

Mounted on the rod 17, at its longitudinal center, is a large globular body member 19 and also mounted on the rod 17 between said member and each pair of bosses 14 and 15 is a small globular body member 20 that acts as a spacer for the body member 19 and holds the same from shifting axially on the rod 17. The body member 19 has a cylindrical lead core 21 that extends completely through said body member. This core 21 has an axial hole 22 through which the rod 17 extends. The core 21 is longitudinally slit at 23 and primarily the joint in said core is open sufficiently to permit the core 21 to be placed on the rod 17 by a radial movement and thereafter the joint is closed. The body member 19 comprises two one-half sections placed around the core 21 and then cemented together.

The spacing body members 20 are identical with the body member 19 and each thereof has a lead core 24 having an axial hole 25 through which the rod 17 extends and is longitudinally slit at 26.

The rod 17, the body members 19 and 20 and the lead cores 21 and 24 all act as a weight that is at the center of gravity and holds the shell 9 with its lower one-half submerged in the water so that its upper half appears as a bubble floating on the water. As the preponderance of weight in the shell 9 is at the center thereof, said shell floats on a equilibrium.

The body members 19 and 20 are made of a clear material such as plastic and the entire surface of the former has a multiplicity of reflecting facets 27. Obviously, the light reflected by the facets 27 acts as a lure, which draws fish to the shell 9 which appears as a bubble in the water, from which they can inhale oxygen.

Notches 28 in the flange 12 afford clearance for the rod 17 and its folded end portions. After the rod 17 and the body members 19 and 20 carried thereby are placed in the section 11, the upper section 10 is placed on the lower section 11, said sections being cemented together as well as the bosses 14 and 15 and cement is also placed around the rod 17 in the notches 16 to form a watertight joint between the sections 10 and 11.

A fishline 29 is attached to one of the eyes 18 and a leader 30 is attached to the other eye 18. Secured to the outer end of the leader 30 is an artificial fly 31. It is not necessary to include a swivel in the leader 30 for the reason that the shell 9 tends to avoid spinning due to its flat surfaces 13. For this same reason there is no danger of the leader 30 and the fly tangling with the line 29. The rod 17 forms a link between the line 29 and the leader 30, thus relieving the shell 9 from all pulling strains.

The shell 9 performs a highly important function and that is at the time of casting, when the shell 9 strikes the water, it lays the line 29, the lead 30 and the fly 31 on the surface of the water. This is highly important for the reason that the leader 20 does not pull the fly 31 under the water. With the leader 30 on the surface of the water, the manipulation of the line 29 by a fisherman will cause the fly 31 to move on the surface of the water in a natural manner.

While there are herein disclosed but one embodiment of the structure, process and product of the invention herein presented, it is possible to produce still other embodiments without departing from the inventive concept herein disclosed, and it is desired, therefore, that only such limitations be imposed on the appended claim as are stated herein or required by the prior art.

What we claim is:

A clear transparent globular shell simulating a bubble and comprising an upper one-half section and a lower one-half section, diametrically horizontally opposite pairs of upper and lower bosses in said shell, the former being integral with the upper section and the latter being integral with the lower section, and the opposing surfaces of the bosses of each pair being substantially in the plane of the joint between the upper and lower sections, and each lower boss having in its upper side a wide longitudinally extended notch, a straight rod extending horizontally through the lower section with its end portions resting in the notches, the end portions of the rod outwardly of the shell each being bent to form an eye and then folded upon itself in the respective notch, the upper bosses holding the rod and its folded portions from turning in the notches, said upper section having an annular flange capping the lower section and having notches straddling the rod and its folded end portions, and a large polyhedral weight within the shell threaded on the rod at its axis, the surface of the weight having a multiplicity of facets, and the upper and lower surfaces of the shell being flattened on parallel horizontal planes.

References Cited in the file of this patent
UNITED STATES PATENTS

| | | |
|---|---|---|
| 1,240,043 | Gregory et al. | Sept. 11, 1917 |
| 1,530,835 | Koepke | Mar. 24, 1925 |
| 2,163,666 | Carter et al. | June 27, 1939 |
| 2,206,274 | Wieberg | July 2, 1940 |
| 2,224,389 | Haselwood | Dec. 10, 1940 |
| 2,381,099 | Baldesberger | Aug. 7, 1945 |